US006595372B1

United States Patent
Minowa et al.

(10) Patent No.: US 6,595,372 B1
(45) Date of Patent: Jul. 22, 2003

(54) FILTER DEVICE (75) Inventors: Takahiro Minowa; Keiji Okada, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/354,735

(22) Filed: Jul. 16, 1999

(51) Int. Cl.[7] .............................................. B01D 35/30
(52) U.S. Cl. .................. 210/440; 210/232; 210/442; 210/443; 210/450; 210/85; 210/94; 210/DIG. 17; 277/918
(58) Field of Search ................. 210/440–442, 210/438, 450, DIG. 17, DIG. 13, 85, 94, 443, 232, 238; 277/918; 106/85–86; 264/342 R (56) References Cited

U.S. PATENT DOCUMENTS

| | | | | | |
|---|---|---|---|---|---|
| 2,808,937 A | * | 10/1957 | O'Mears | | |
| 3,250,397 A | * | 5/1966 | Moltchan | | |
| 3,262,563 A | * | 7/1966 | Pall | | |
| 3,873,018 A | * | 3/1975 | Donnay | | |
| 3,923,663 A | * | 12/1975 | Reid | ............ | 210/251 |
| 3,931,015 A | * | 1/1976 | Jenkins | ............ | 210/232 |
| 4,017,400 A | * | 4/1977 | Schade | ............ | 210/439 |
| 4,379,009 A | * | 4/1983 | Shibata et al. | | |
| 5,035,797 A | * | 7/1991 | Jank | ............ | 210/232 |
| 5,178,753 A | * | 1/1993 | Trabold | ............ | 210/130 |
| 5,548,893 A | | 8/1996 | Koelfgen | ............ | 29/888.011 |
| 5,573,666 A | * | 11/1996 | Korin | ............ | 210/232 |
| 5,593,577 A | * | 1/1997 | Imai et al. | ............ | 210/232 |
| 5,641,084 A | * | 6/1997 | Rice | | |
| 5,922,158 A | * | 7/1999 | Culp et al. | | |

FOREIGN PATENT DOCUMENTS

| | | | |
|---|---|---|---|
| FR | 2 743 506 A | | 7/1997 |
| JP | 7-100310 | * | 4/1995 |

OTHER PUBLICATIONS

Derwent Abstract of JP 7–100310.*

* cited by examiner

*Primary Examiner*—Matthew O. Savage
*Assistant Examiner*—Marianne Ocampo
(74) *Attorney, Agent, or Firm*—Armstrong, Westerman, Hattori, McLeland & Naughton LLP (57) ABSTRACT

A filter device includes a tubular casing [10] with a closed bottom, a filter element [20] received within the casing [10], a lid [30] which closes an open end of the casing [10], and has a communication hole communicating the inside and outside of the casing [10] with each other, and a fastening member [50] fastening the casing [10] and the lid [30] together. A gap is formed between a peripheral wall [14] of the open end portion of the casing [10] and a peripheral surface [32] of that portion of the lid opposed to the peripheral wall [14]. A radial seal width w of an annular elastic seal member [18] to be mounted in the gap is larger than a width d of the gap in the radial direction, and the seal member [18] closes the gap liquid-tight in the radial direction, and the seal member [18] closes the gap liquid-tight in the radial direction when the filter device is assembled. With the filter device, a positive seal therebetween can be achieved, even if a casing and a lid are fastened together somewhat inadequately.

29 Claims, 10 Drawing Sheets

FILTER DEVICE

BACKGROUND OF THE INVENTION

This invention relates to a filter device for filtering a liquid by a filter element received therein.

Figure 10:
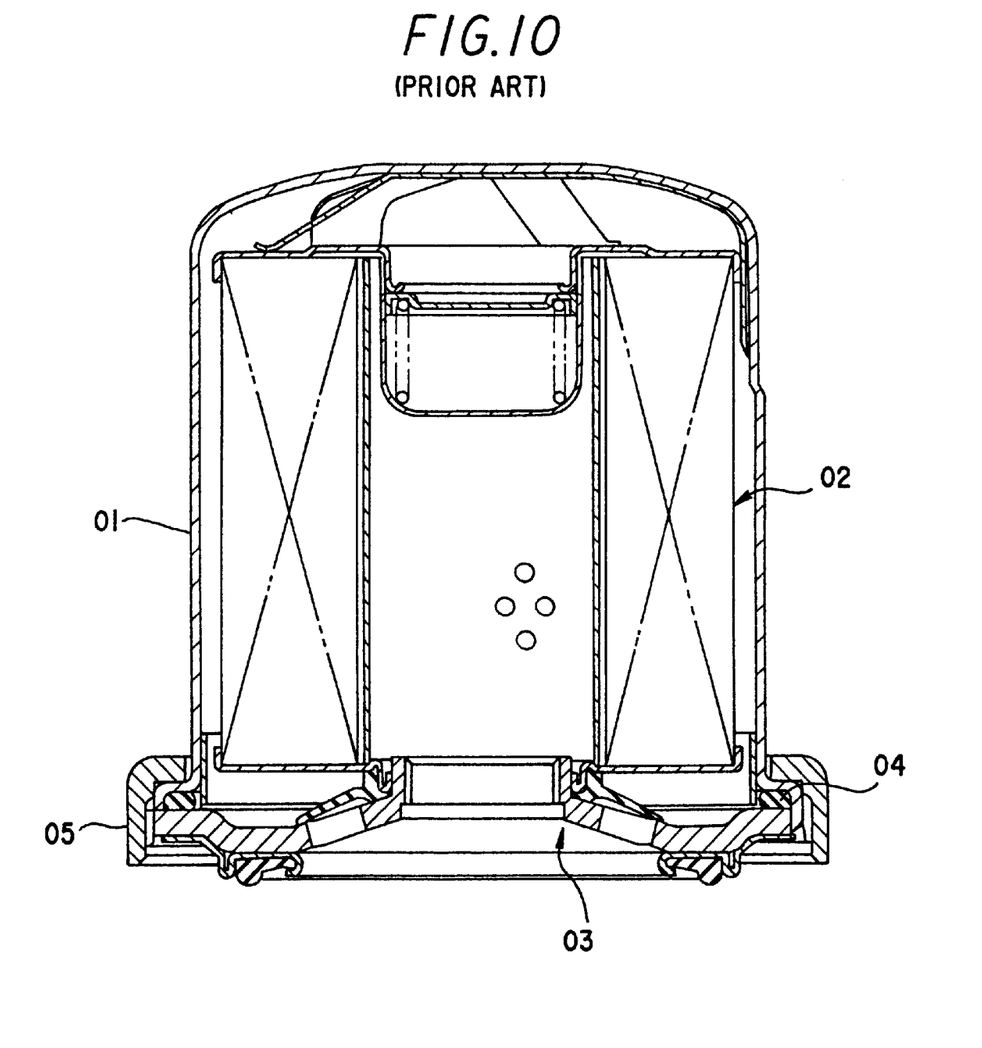
FIG. 10 is a cross-sectional view of a conventional oil filter device.

A conventional filter device, having an exchangeable filter element, is disclosed in Japanese Patent Unexamined Publication No. 7-100310 earlier filed by the Applicant of the present application, and this filter device is shown in FIG. 10.

A cartridge-type filter element 02 is received within a cylindrical casing 01 with a closed bottom, and a set plate 03, serving as a lid, is mounted at an open end (opening) of the casing 01 through an O-ring (seal member) 04 to close the same. A ring nut (ring-shaped fastening member) 05 is threaded on an external-thread portion, formed on an outer peripheral surface of the set plate 03, thereby fixing the set plate 03 to the casing 01.

The O-ring 04, held between the casing 01 and the set plate 03, is compressed axially to form an axial seal, but does not form a radial seal.

Therefore, if the ring nut 05 fails to be completely threaded on the set plate, there is a possibility that the O-ring 04 is not compressed, or is inadequately compressed between the casing 01 and the set plate 03 when tightening the ring nut 05, so that the positive seal is not obtained.

Particularly when a foreign matter is caught in the threaded portions of the ring nut 05 and the set plate 03, or when dust and dirt are present in the thread grooves, there is a possibility that the threaded engagement is not effected completely, and in such a case the seal is incomplete.

SUMMARY OF THE INVENTION

This invention has been made in view of the above problems, and an object of the invention is to provide a filter device in which even if a casing and a lid are fastened together somewhat inadequately, a positive seal therebetween is achieved.

The above object has been achieved by a filter device according to a first aspect of the present invention comprising a tubular casing with a closed bottom, a filter element received within the casing, a lid which closes an open end of the casing, and has a communication hole communicating the inside and outside of the casing with each other, and a fastening member fastening the casing and the lid together; wherein a gap is formed between a peripheral wall of the open end portion of the casing and a peripheral surface of that portion of the lid opposed to the peripheral wall; a radial seal width of an annular elastic seal member to be mounted in the gap is larger than a width of the gap in the radial direction; and the seal member closes the gap liquid-tight in the radial direction when the filter device is assembled.

The radial seal width of the annular elastic seal member to be mounted in the gap, formed between the peripheral wall of the open end portion of the casing and the peripheral surface of that portion of the lid opposed to the peripheral wall, is larger than the width of the gap in the radial direction, and therefore during the assembling operation, the elastic seal member, while compressed in the radial direction, is press-fitted into the gap, and therefore even if the fastening of the lid to the casing by the fastening member is somewhat inadequate, the liquid-tight seal is formed, thereby maintaining the sealing effect.

The above object has also been achieved by a filter device according to a second aspect of the present invention comprising a tubular casing with a closed bottom which includes a barrel portion having an open distal end portion formed into a different-diameter portion, different in diameter from the barrel portion, through a step portion, a filter element received within the casing, a lid which closes the open end of the barrel, and has a communication hole communicating the inside and outside of the casing with each other, and a fastening member fastening the casing and the lid together; wherein the lid includes a peripheral portion opposed to the step portion of the casing in an axial direction, and an opposed peripheral wall opposed to the different-diameter portion in a radial direction, so that the peripheral portion and the opposed peripheral wall cooperate with the step portion and the different-diameter portion of the casing to form a gap; and an annular elastic seal member, mounted in the gap, is held between the step portion of the casing and the peripheral portion of the lid, and is compressed in the axial direction during an assembling operation, so that the seal member is expanded and deformed in the radial direction, thereby forming a liquid-tight seal between the different-diameter portion of the casing and the opposed peripheral wall of the lid.

When the lid is fastened to the casing by the fastening member, the elastic seal member is compressed in the axial direction between the step portion of the casing and the peripheral portion of the lid, so that the elastic seal member is expanded and compressed in the radial direction, thereby forming the liquid-tight seal between the different-diameter portion of the casing and the opposed peripheral wall of the lid. Therefore, if the seal member is compressed to a certain degree in the axial direction by the fastening operation, the positive seal can be achieved even if the fastening is somewhat inadequate.

In the above-mentioned filter device according to the first and second aspect of the invention of claim 3, it is advantageous that the open edge of the peripheral wall of the open end portion of the casing is bent in a direction to avoid the seal member fitted on the peripheral surface of the lid.

During the assembling operation, the elastic seal member is forced into the radial gap, and therefore the open end edge of the peripheral wall of the casing, forming the gap, is bent so as to avoid the seal member during the assembling operation, and with this construction, the seal member can be inserted into the gap without damaging the seal member, and the good sealing effect can be maintained.

In the above-mentioned filter device, it is preferable that an indication portion is provided on an outer surface of the casing and is covered with a heat-shrinkable member having a light-transmitting property.

The indication portion is covered with the heat-shrinkable member having the light-transmitting property, and therefore an indication on the indication portion can be seen through the heat-shrinkable member. When the contents of the indication can not be clearly seen because of damage or the like, the heat-shrinkable member is peeled or removed, and a new indication portion is provided, and then is covered with a new heat-shrinkable member. By doing so, the indication portion can be easily exchanged, and the indication on the indication portion can always be kept in a clearly-seen condition with such a simple operation at a low cost.

The heat-shrinkable member protects the indication portion from damage from the exterior.

In the above-mentioned filter device according to the present invention, it is also preferable that the casing is covered with a heat-shrinkable member having an indication portion.

The indication portion is provided at the heat-shrinkable member for covering the casing, and therefore when the indication can not be clearly seen, the heat-shrinkable member is peeled or removed, and a new heat-shrinkable member, having the indication portion, is applied to cover the casing, and therefore this exchange operation can be effected easily.

Further, in the above-mentioned filter device according to the present invention, it is also preferable that the open end of the casing is closed by the lid, and the lid is fastened to the casing by the ring nut, and an indication portion on an outer surface of the barrel portion of the casing is covered with a heat-shrinkable member having a light-transmitting property; and the heat-shrinkable member is provided to cover the barrel portion of the casing over a circumference thereof in such a manner that the heat-shrinkable member is disposed close to the smaller-diameter portion of the ring nut, threaded on the lid, to close a gap between the barrel portion of the casing and the smaller-diameter portion of the ring nut.

The heat-shrinkable member is provided to cover the barrel portion of the casing in such a manner that it closes the gap between the casing and the smaller-diameter portion of the ring nut, and therefore the intrusion of foreign matters, dust and dirt can be prevented.

When the indication portion can not be clearly seen, the heat-shrinkable member is peeled or removed, and a new heat-shrinkable member is applied to cover the casing, and with this simple exchange operation, the indication on the indication portion can always be kept in a clearly-seen condition at a low cost.

The heat-shrinkable member protects the indication portion against damage from the exterior and damage liable to occur when attaching and detaching the ring nut for maintenance purposes.

Furthermore, in the above-mentioned filter device according to the present invention, it is also preferable that the open end of the casing is closed by the lid, and the lid is fastened to the casing by the ring nut, and an indication portion on an outer surface of the barrel portion of the casing is covered with a heat-shrinkable member having a light-transmitting property, and that the heat-shrinkable member is provided to cover the barrel portion of the casing and the outer peripheral surface of the ring nut over a circumference thereof.

The heat-shrinkable member is provided to cover the barrel portion of the casing and the outer peripheral surface of the ring nut over the circumference thereof, and therefore the heat-shrinkable member closes the gap between the casing and the ring nut, thereby completely preventing the intrusion of foreign matter, dust, dirt and water.

When the indication portion can not be clearly seen, the heat-shrinkable member is peeled or removed, and a new heat-shrinkable member is applied to cover the casing and the ring nut, and with this simple exchange operation, the indication on the indication portion can always be kept in a clearly-seen condition at a low cost.

The heat-shrinkable member protects the indication portion against damage from the exterior and damage liable to occur when attaching and detaching the ring nut for maintenance purposes.

In the above-mentioned filter device according to the present invention, it is advantageous that a line of cut is formed axially in the heat-shrinkable member.

The heat-shrinkable member can be torn axially along the cut line without the use of any tool, and therefore can be easily removed from the casing. Therefore, the heat-shrinkable member can be exchanged more easily.

DETAILED DESCRIPTION OF THE PREFERRED EMBODIMENTS

One preferred embodiment of the present invention will now be described with reference to FIGS. 1 to 5.

Figure 1:
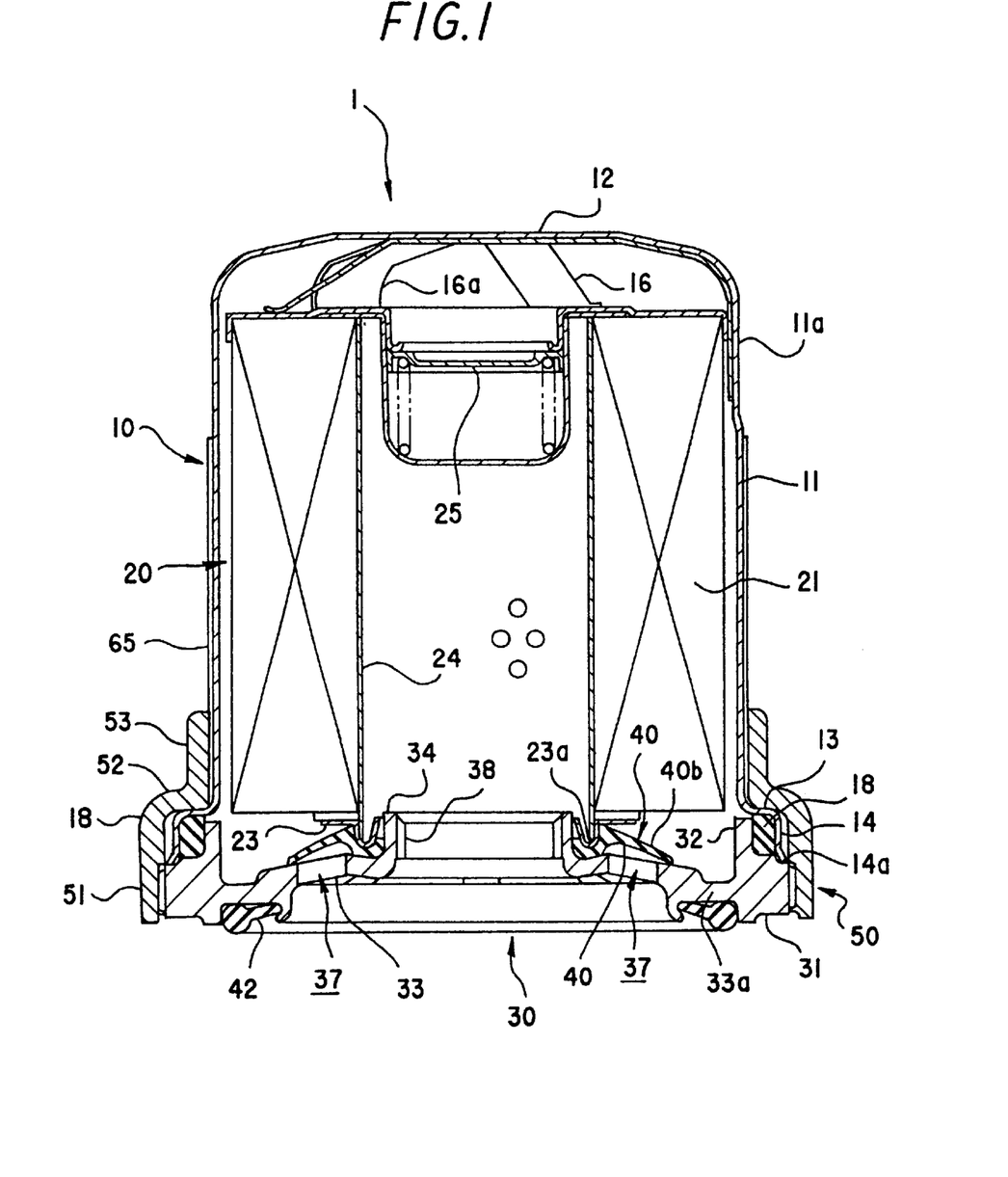
FIG. 1 is a cross-sectional view of one preferred embodiment of an oil filter device of the present invention.
Figure 2:
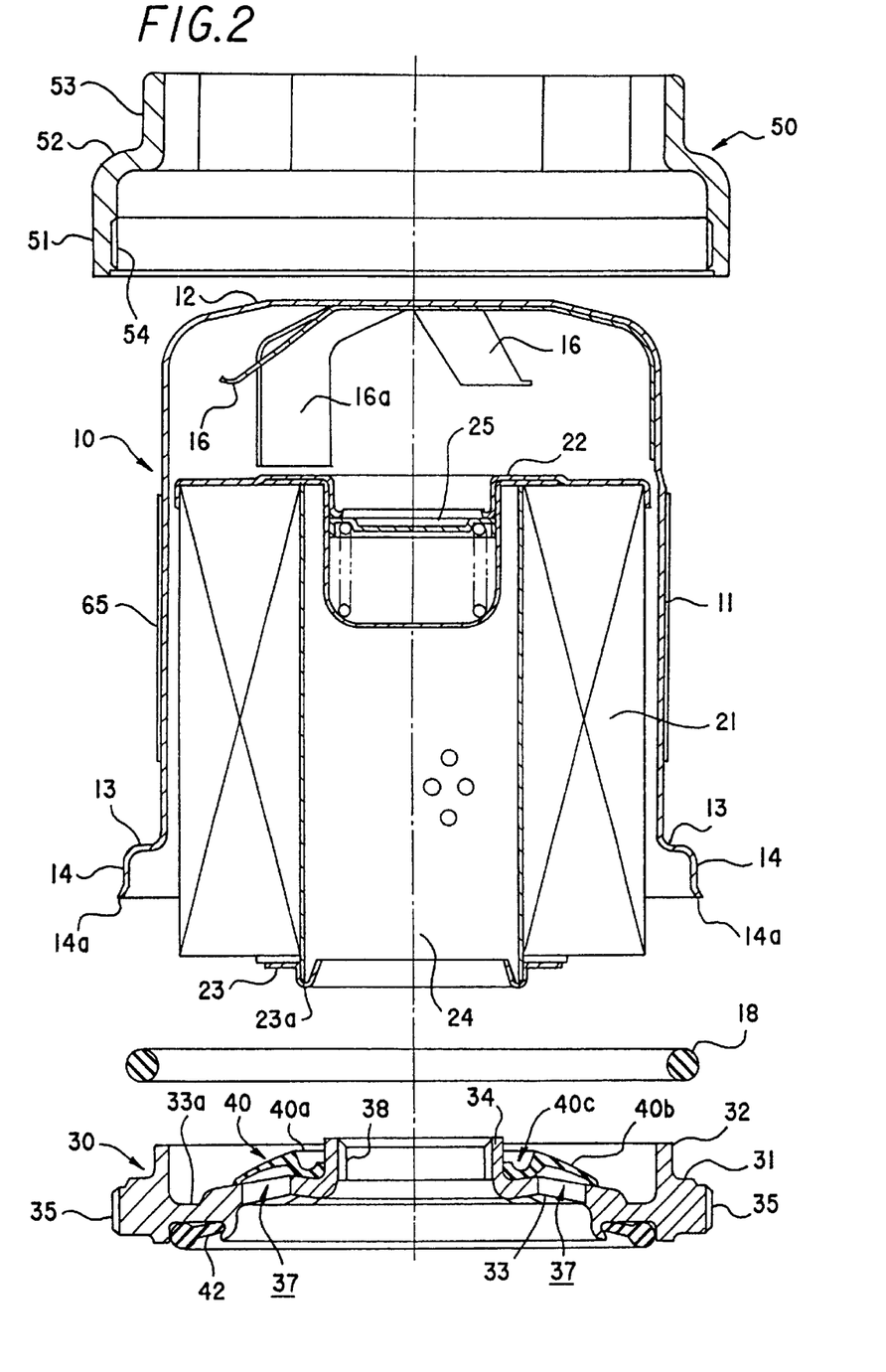
FIG. 2 is a partly-exploded, cross-sectional view of the filter device.
Figure 3:
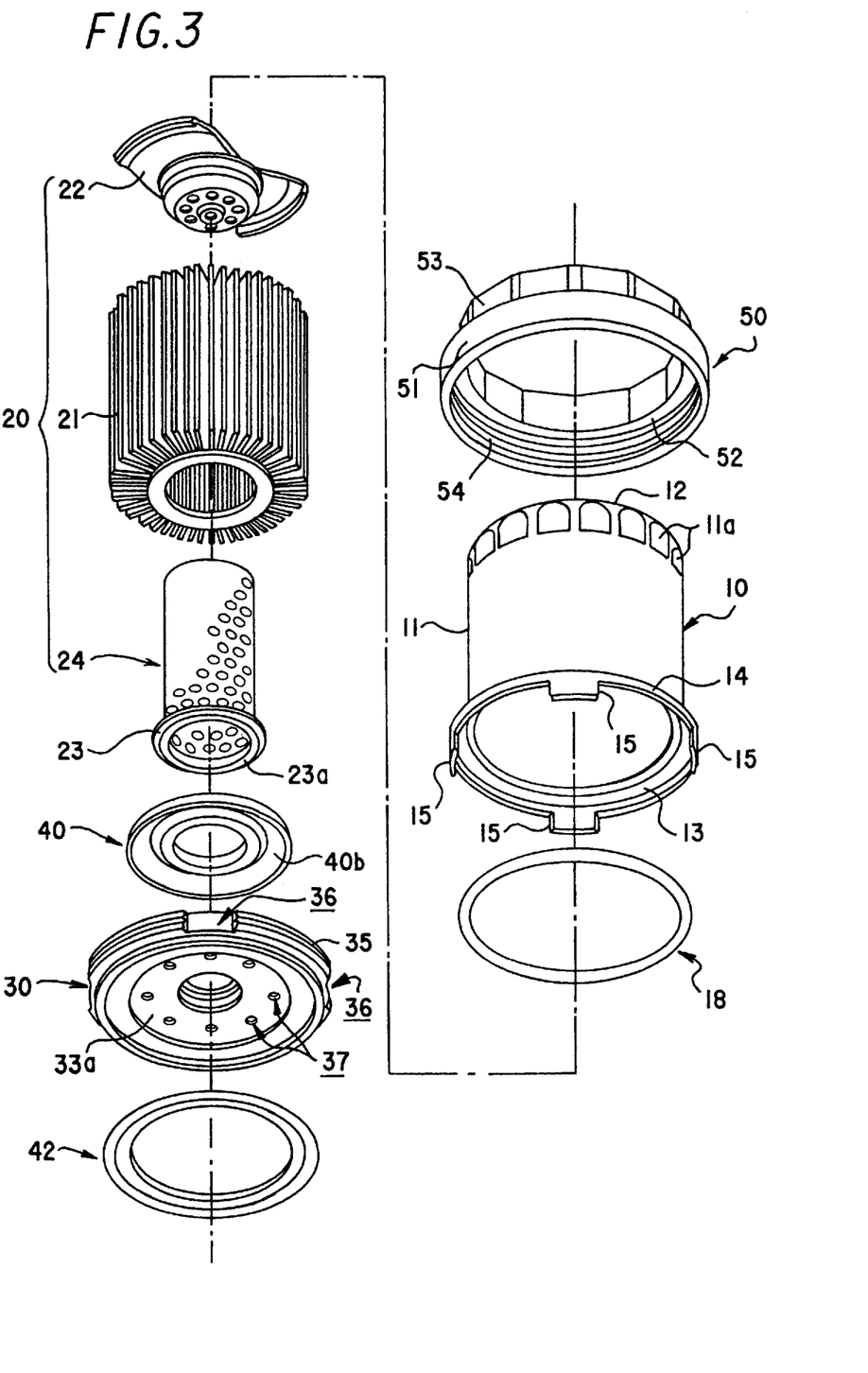
FIG. 3 is an exploded, perspective view of the filter device.

FIG. 1 is a cross-sectional view of an oil filter device 1 of the element exchangeable-type used in an automobile, FIG. 2 is a partly-exploded, cross-sectional view of this filter device, and FIG. 3 is an exploded, perspective view of this filter device.

A cartridge-type filter element 20 is received within a cylindrical casing 10 with a closed bottom, and a set plate 30, serving as a lid, is mounted at an open end (opening) of the casing 10 through an O-ring (elastic seal member) 18 to close the same. The set plate 30 is fixed to the casing 10 by a ring nut (ring-shaped fastening member) 50.

A body (barrel portion) 11 of the casing 10 is closed at its one end by a bottom portion 12, and the other end portion (open end portion) thereof is formed into a larger-diameter portion (different-diameter portion) 14 which is different or slightly larger in diameter than the barrel portion 11. The casing 10 has a step portion 13 interconnecting the barrel portion 11 and the larger-diameter portion 14, so that the peripheral wall of the casing 10 has a crank-shaped cross-section.

An end edge of the larger-diameter portion 14 is curved outwardly (see FIGS. 2 and 5), and four engagement projections 15 project from this curved portion 14a in the direction of opening of the open end, and are spaced from one another at equal intervals, as shown in FIG. 2.

A plurality of polygonal surfaces 11a are formed at an upper portion (peripheral portion adjacent to the edge of bottom portion 12) of the barrel portion 11.

As shown in FIGS. 1 and 2, a leaf spring 16 is provided within the casing 10, and extends radially obliquely from its central base portion disposed on the inner surface of the bottom portion 12.

Support arms 16a extend radially from the leaf spring 16, and are resiliently deformed to extend along the inner surface of the casing 10 over an area including the bottom portion 12 and its adjoining portion of the barrel portion 11, so that the leaf spring 16 can be held in position by this resilient force.

The filter element 20 of the exchangeable cartridge-type comprises a cylindrical filter 21, formed by folding a filter paper into a corrugated configuration, an end plate 22 held on an upper end surface of the filter 21, and a holder plate 24 which covers an inner peripheral surface of the filter 21, and holds the filter 21 (see FIG. 3), the holder plate 24 having a number of perforations.

An open upper end of the cylindrical holder plate 24 is closed by a relief valve 25.

A flange 23 is formed at a lower end of the holder plate 24, and an inner edge portion thereof is bent in a wavy manner, and extends inwardly to form an opening portion 23a, and this opening portion 23a is projected slightly downwardly.

Figure 4:
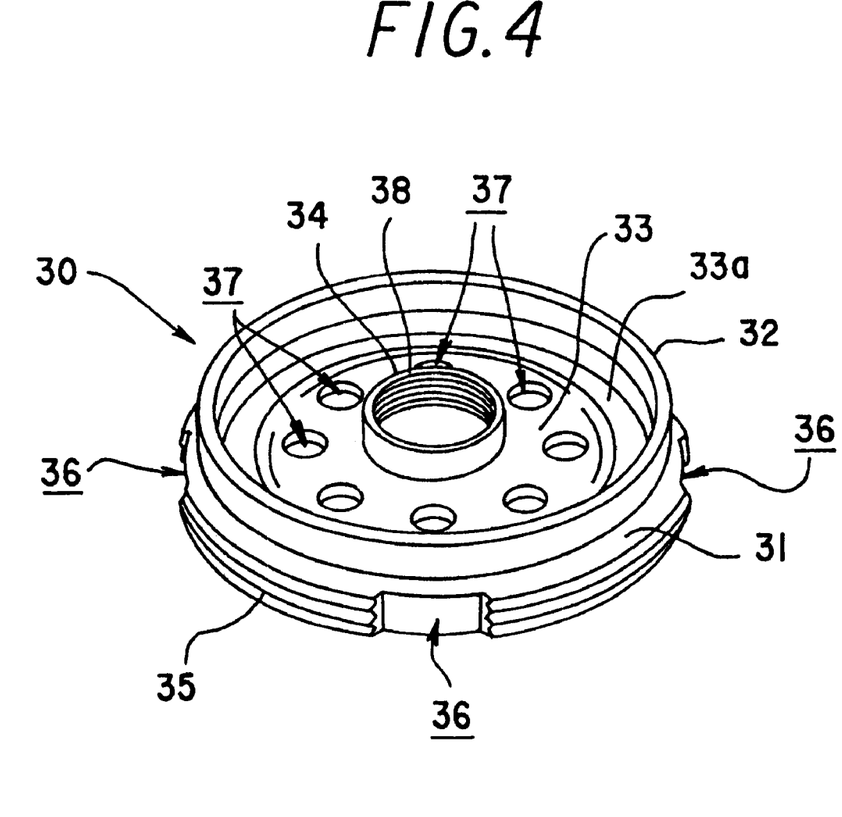
FIG. 4 is a perspective view of a set plate.

As shown in FIGS. 3 and 4, the set plate 30 is generally in the form of a hollow disk, and has an inner peripheral wall 32 formed inwardly of a peripheral portion 31 thereof. A tapering portion 33 extends inwardly from a lower end of the inner peripheral wall 32 through a horizontal bottom portion 33a, and this tapering portion 33 is gently slanting upwardly. A cylindrical outlet port portion 34 is formed at the inner periphery of the tapering portion 33.

The outer diameter of the set plate 30 is slightly larger than the diameter of the larger-diameter portion 14 of the casing 10, and external threads 35 are formed on the outer peripheral surface of the peripheral portion 31.

Four notches 36 for respectively receiving the engagement projections 15 of the casing 10 are formed in this outer peripheral surface, having the external threads 35 formed thereon, and are spaced from one another at equal intervals.

Eight inlet ports 37 are formed through the tapering portion 33 of the set plate 30, and are spaced from one another at equal intervals, and are equidistant from the center of the set plate 30.

The cylindrical outlet port portion 34 is projected upwardly beyond the tapering portion 33, and the outer diameter of this outlet port portion 34 is generally equal to the inner diameter of the guide portion 23a of the flange 23 formed at the lower end of the filter element 20. Internal threads 38 are formed on the inner peripheral surface of the outlet port portion 34.

As shown in FIG. 2, a valve 40, made of rubber, is fitted and held on the outer periphery of the outlet port portion 34, and this valve 40 has an extension portion 40b, extending from its fitting portion 40a (fitted on the outlet port portion 34) in a centrifugal direction over the tapering portion 33, and this extension portion 40b closes the inlet ports 37 from the upper side.

With this construction, there is provided the one-way valve which allows oil to flow into the filter through the inlet ports 37 upon deformation of the extension portion 40b, but prevents the flow of the oil in a reverse direction.

The fitting portion 40a of the valve 40 has a recess 40c in which the guide portion 23a of the flange 23, formed at the lower end of the holder plate 24, is received.

An annular seal member 42 is fitted in the lower side of the horizontal bottom portion 33a of the set plate 30.

The ring nut 50 includes a cylindrical portion 51 of a larger diameter, having a smooth cylindrical surface, and a polygonal tubular portion 53 (having flat surfaces) of a smaller-diameter formed at one end of the cylindrical portion 51 through a step portion 52.

Therefore, the ring nut 50 can be rotated by a rotary tool engaged with the polygonal tubular portion 53, and thus the ring nut 50 has the simple configuration, and does not have any projection or the like for engagement with a tool, and can be easily produced by pressing.

The inner diameter of the cylindrical portion 51 is slightly larger than the outer diameter of the larger-diameter portion 14 of the casing 10, and the diameter of an inscribed circle of the polygonal tubular portion 53 is slightly larger than the outer diameter of the barrel portion 11 of the casing 10, and therefore the barrel portion 11 can pass through the polygonal tubular portion 53, but the larger-diameter portion 14 can not pass through the polygonal tubular portion 53.

Internal threads 54 for threaded engagement with the external threads 35, formed on the outer peripheral surface of the set plate 30, are formed on the inner peripheral surface of the cylindrical portion 51.

Figure 6:
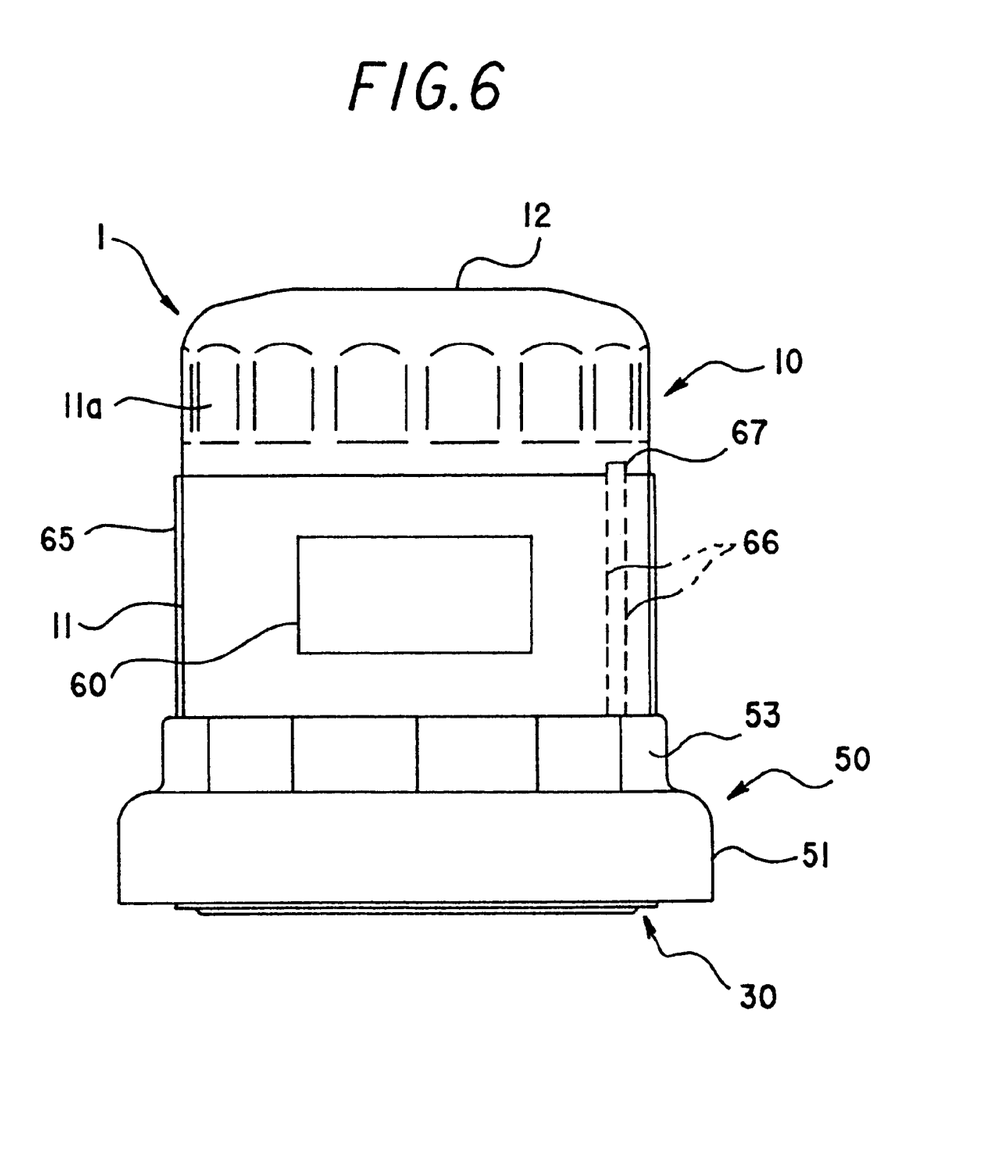
FIG. 6 is a side-elevational view of the preferred embodiment of an oil filter device of the present invention.

A method of assembling the oil filter device 1 of this construction will be described below. However, in the embodiment, before this assembling operation, a rectangular caution label 60, serving as an indication portion, is affixed to a portion of the barrel portion 11 of the casing 10, and this caution label 60 is covered with a heat-shrinkable member 65 made of a resin.

The heat-shrinkable member 65 is made of a transparent or light-transmitting resin shrinkable upon application of heat, such as vinyl chloride, polyethylene and polyester. The heat-shrinkable member 65 is formed into a cylindrical shape which is slightly larger in outer diameter than the barrel portion 11 of the casing 10, and is shorter than the barrel portion 11 in the axial direction. Two parallel broken lines 66 of cut are formed in the heat-shrinkable member 65, and extend in the axial direction, and that portion of the heat-shrinkable member 65, lying between the two cut lines 66 and 66, extends slightly beyond one edge of the heat-shrinkable member 65 to form a removal tab 67.

The heat-shrinkable member 65 of such a cylindrical shape is fitted on a predetermined portion of the barrel portion 11 of the casing 10 having the caution label 60 affixed thereto, and when heat is applied to this heat-shrinkable member 65, this member 65 is shrunk in diameter to be held in intimate contact with the outer surface of the casing, so that the heat-shrinkable member 65 covers the outer surface of the barrel portion of the casing 10 over the entire periphery thereof in intimate contact therewith, and is disposed between the polygonal surface 11a, formed at the upper end portion thereof, and the larger-diameter portion 14 formed at the lower end portion thereof.

The caution label 60 is held against the barrel portion 11 of the casing 10 by the heat-shrinkable member 65, and the outer surface of the caution label 60 is protected by the heat-shrinkable member 65.

The heat-shrinkable member 65 is transparent, and the indication on the caution label 60 can be viewed through the heat-shrinkable member 65.

The assembling operation is effected in the following manner, using the casing 10 having the barrel portion thus covered with the heat-shrinkable member 65.

First, the leaf spring 16 is inserted into the casing 10, and is held in position on the bottom portion 12 while flexing the support arms 16a. Then, when the filter element 20 is inserted in the casing 10, with the relief valve 25 first introduced thereinto, the element plate 22 abuts against the distal ends of the leaf spring 16 to resiliently deform the leaf spring 16, so that the filter element 20 is urged in a removing direction.

On the other hand, the valve 40 is fitted on the outlet port portion 34 of the set plate 30, and the O-ring 18 is mounted on the peripheral portion 31 in fitting relation to the inner peripheral wall 32.

Figure 5:
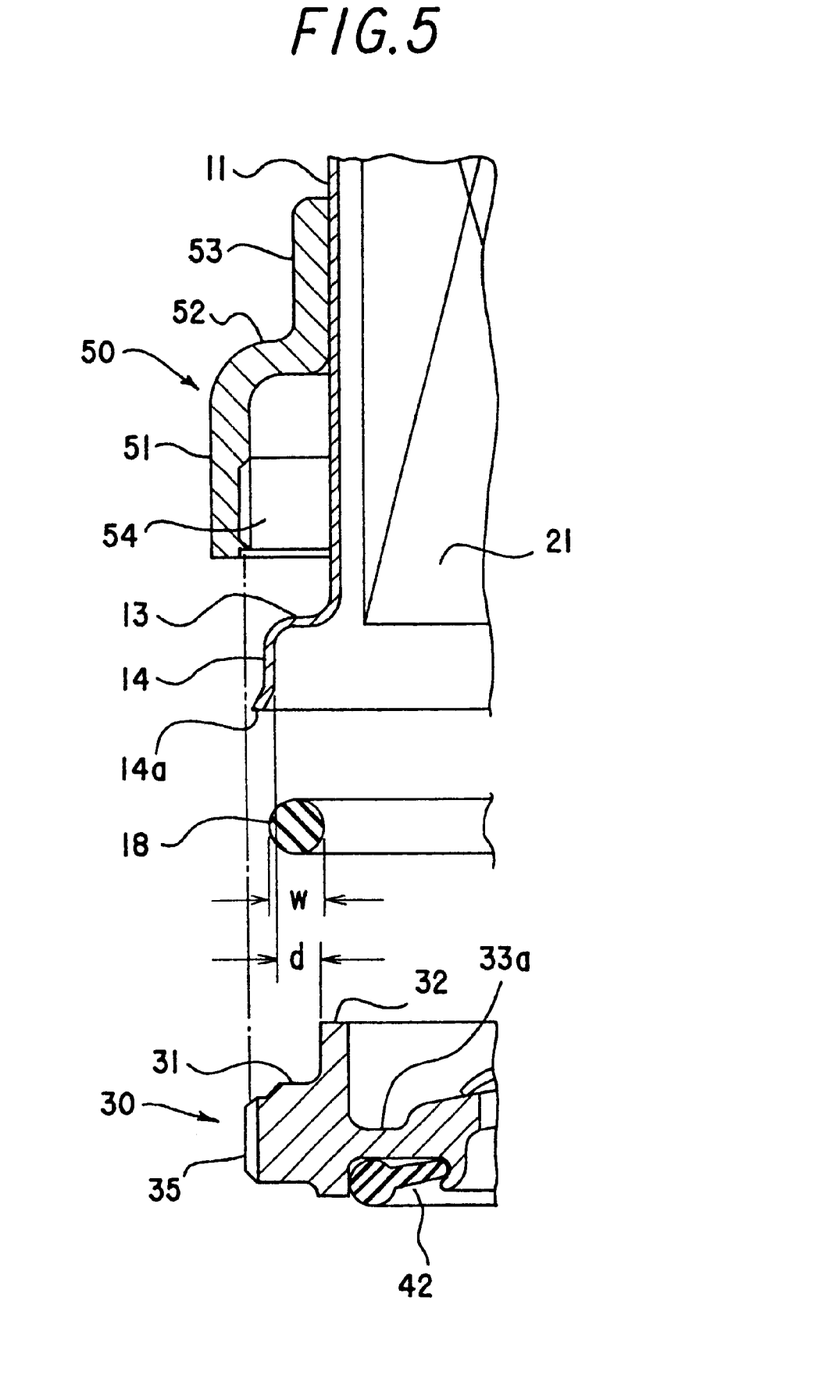
FIG. 5 is an exploded, cross-sectional view of an important portion.

In FIG. 5, a seal width w of the O-ring 18 in the radial direction is larger than a width d of a radial gap between the larger-diameter portion 14 of the casing 10 and the inner peripheral wall 32 of the set plate 30.

Thus, the outer diameter of the O-ring 18, fitted on the outer periphery of the inner peripheral wall 32 of the set plate 30, is slightly larger than the inner diameter of the larger-diameter portion 14 of the casing 10, and therefore when the open end of the casing 10 is closed by the set plate 30, the O-ring 18 is compressed and deformed between the inner peripheral wall 32 and the larger-diameter portion 14 in the radial direction.

The end edge of the larger-diameter portion 14 of the casing 10 is curved outwardly to form the curved portion 14a, and therefore in this assembling operation, the smoothly-curved surface of the curved portion 14a is brought into engagement with the O-ring 18, and then the O-ring 18 is easily compressed and deformed. Therefore, the O-ring 18 will not be damaged, and the sealing ability is prevented from being lowered by damage to the O-ring 18.

The O-ring 18, thus compressed and deformed in the assembling operation, forms a seal between the inner peripheral wall 32 and the larger-diameter portion 14 in the radial direction.

If the end edge of the larger-diameter portion 14 of the casing 10 is bent outwardly, this end edge will not damage the O-ring 18. However, if this end edge is curved outwardly as in this embodiment, the curved surface of this curved portion 14a serves as a guide surface for guiding the O-ring 18 in the assembling operation, and this facilitates the assembling operation.

Then, the four notches 36, formed in the peripheral portion 31 of the set plate 30, are brought respectively into registry with the four engagement projections 15 on the larger-diameter portion 14 of the casing 10, and the engagement projections 15 are fitted respectively into the notches 36, thereby positioning the set plate 30 relative to the casing 10 in the radial direction.

The outlet port portion 34, projecting from the central portion of the set plate 30, is inserted in the opening portion 23a in the flange 23 of the filter element 20.

When the opening portion 23a is engaged in the recess portion 40c of the valve 40, disposed coaxially with the outlet port portion 34, upon insertion of the outlet port portion 34 into the opening portion 23a, the filter element 20 is pushed into the casing 10 against the bias of the leaf spring 16, and then the engagement projections 15 of the casing 10 are fitted respectively into the notches 36 in the set plate 30.

Thanks to the formation of the radial seal by the O-ring 18, a space, isolated from the exterior, is defined by the casing 10 and the set plate 30. The opening portion 23a of the flange 23, formed at the lower end of the filter element 20, is fitted in the recess 40c in the valve 40, so that the fitting portion 40a, formed at the proximal end of the valve 40, is held between the opening portion 23a and the tapering portion 33 of the set plate 30, thereby interrupting the communication between the outside of the filter 21 (leading to the inlet ports 37) and the inside of the filter 21 leading to the outlet port 34.

Then, the ring nut 50 is first brought into opposed relation to the bottom portion 12 of the casing 10, and then is fitted on the casing 10, so that this ring nut 50 is fitted on the larger-diameter portion 14. Then, the internal threads 54 on the cylindrical portion 51 are properly positioned relative to the external threads 35 on the set plate 30, and then the ring nut 50 is rotated while holding the casing 10 in a fixed condition, thereby threadedly engaging the internal threads 54 with the external threads 35.

At this time, the ring nut 50 can be rotated by a rotary tool engaged with the polygonal tubular portion 53.

When the casing 10 is fixed, the set plate 30 is fixed thereto since the engagement projections 15 are engaged respectively in the notches 36, and therefore the set plate 30 will not be rotated when rotating the ring nut 50, and the above threaded engagement is effected smoothly.

The set plate 30 is threaded into the ring nut 50 through the threaded engagement of the external threads 35 of the set plate 30 with the internal threads 54 of the ring nut 50. At this time, the casing 10 is prevented from axial movement since the step portion 13 of this casing 10 is abutted against the step portion 52 of the ring nut 50, and therefore set plate 30 is threaded into the ringnut 50 while pressing the filter element 20 into the casing 10.

Therefore, the fitting portion 40a of the valve 40 is clamped with a large pressure, thereby positively interrupting the communication between the outside and inside of the filter 21, and in this engaged condition, the O-ring 18, fitted on the outer periphery of the inner peripheral wall 32 of the set plate 30, is held between the peripheral portion 31 of the set plate 30 and the step portion 13 of the casing 10, and therefore is pressed in the axial direction.

Therefore, the O-ring 18, thus compressed in the axial direction, tends to expand in the radial direction, and therefore the O-ring 18, which forms at first a certain degree of radial seal between the inner peripheral wall 32 and the larger-diameter portion 14, is compressed therebetween with a higher pressure in the radial direction, thereby providing the more positive sealing ability.

The inner peripheral wall 32 is formed integrally with the set plate 30, and therefore there is no need to provide any means for forming a seal therebetween, and besides the number of the component parts is reduced.

Even if the fastening of the ring nut 50 is somewhat inadequate because of a foreign matter or the like caught in the threaded portions, a certain degree of liquid-tight seal is formed in the radial direction, and upon application of a certain degree of pressure in the axial direction, the radial seal is enhanced, and therefore the required sealing ability can be easily secured.

FIG. 1 shows a condition in which the ring nut 50 is fully threaded on the set plate 30. In this condition, the heat-shrinkable member 65 is slightly disposed in a gap between the outer peripheral surface of the barrel portion 11 of the casing 10 and the inner peripheral surface of the polygonal tubular portion 53 of the ring nut 50, and therefore closes this gap, thereby preventing foreign matter, dust and dirt from intruding into the ring nut 50.

The oil filter device 1 thus assembled is mounted on an engine of an automobile.

An externally-threaded member of a tubular shape projects from a mounting surface of the engine, and this threaded member is threadedly engaged with the internal threads 38 formed on the inner peripheral surface of the outlet port portion 34.

At this time, by rotating the casing 10, the set plate 30 can be rotated therewith, thereby easily achieving this threaded engagement.

In contrast, the casing 10 is rotated in a reverse direction, and the oil filter 1 is removed from the mounting portion of the engine, and the ring nut 50 is rotated to be brought out of threaded engagement with the set plate 30. By doing so, the filter device can be disassembled as shown in FIG. 3, and only the filter element 20 can be easily exchanged with a new one.

The casing 10 and the set plate 30 will not be angularly moved relative to each other because of the engagement of the engagement projections 15 in the respective notches 36, and therefore the O-ring 18 and the valve 40, held between the casing 10 and the set plate 30, will not be damaged, and the high sealing ability can be secured.

In this embodiment, when the open end of the casing 10 is to be closed by the set plate 30, the casing and the set plate are positioned relative to each other in the radial direction by engaging the four engagement projections 15, extending from the larger-diameter portion 14 of the casing 10, respectively in the four notches 36 in the set plate 30. However, if the length of the larger-diameter portion 14 in the axial direction is increased, the positioning in the radial direction can be achieved by this larger-diameter portion 14.

Even if there is used a construction in which the open end portion of the casing is formed into a smaller-diameter portion through a step portion while the peripheral wall of the set plate is larger in diameter than this smaller-diameter portion, and is disposed in surrounding relation to the smaller-diameter portion, and the O-ring, provided in a gap between the smaller-diameter portion and the peripheral wall, is compressed in the radial direction to form a liquid-tight seal.

The surface of the caution label 60 is covered with the heat-shrinkable member 65, and therefore the indication on the caution label 60 is prevented from damage from the exterior such as a flying stone, and this indication can be kept in a clearly-seen condition.

The heat-shrinkable member 65 protects not only the caution label 60 but also the surface of other portion of the barrel portion 11 of the casing 10.

For effecting the maintenance or for exchanging the filter element, the casing 10 is rotated in a reverse direction, and the oil filter 1 is removed from the mounting portion of the engine, and the ring nut 50 is rotated to be brought out of threaded engagement with the set plate 30 by a rotary tool engaged with the polygonal tubular portion 53 of the ring nut 50. By doing so, the filter device can be disassembled as shown in FIG. 3. At this time, the barrel portion 11 may be damaged by the ring nut 50 when removing the ring nut 50 from the barrel portion 11 of the casing 10, but the caution label 60 is protected by the heat-shrinkable member 65.

If damage from the exterior is so repeatedly applied to the casing that the indication on the caution label can not be clearly seen, or if a scratch is deep enough to reach the caution label 60, the removal tab 67 is gripped, and is pulled, and by doing so, the heat-shrinkable member 65 can be easily torn along the two cut lines 66 and 66, and the caution label 60 is exchanged with a new one, and this new caution label is covered with a new heat-shrinkable member 65.

The caution label bears the indication, and therefore the clear indication can be provided by exchanging the caution label, and this operation is easier as compared with the case where the indication is printed on the barrel portion of the casing 10.

Even if the indication is printed on the barrel portion of the casing 10, it is protected from damage from the exterior by the heat-shrinkable member.

In the case where the indication portion is provided on the reverse surface or the obverse surface of the heat-shrinkable member, the indication portion is replaced by a new one simultaneously when the heat-shrinkable member is exchanged with a new one, and therefore the exchanging operation is more easier.

The indication on the indication portion may be formed by printing, or may be provided by a label or the like affixed to the casing.

In the case where the indication portion is provided on the outer surface of the heat-shrinkable member, this heat-shrinkable member does not need to have a light-transmitting property.

In the above embodiment, although the casing 10, to which the heat-shrinkable member 65 is beforehand attached to cover the caution label 60, is used when assembling the filter device, the casing may be covered with the heat-shrinkable member 65 after the filter device 1 is assembled, and in this case the heat-shrinkable member 65 is attached to the casing in such a manner that the lower edge of the heat-shrinkable member 65 is disposed as close to the ring nut 50 as possible so as to close the gap between the barrel portion 11 of the casing 10 and the polygonal tubular portion 53 of the ring nut 50, thereby preventing foreign matters, dust and dirt from intruding into the ring nut 50.

Figure 7:
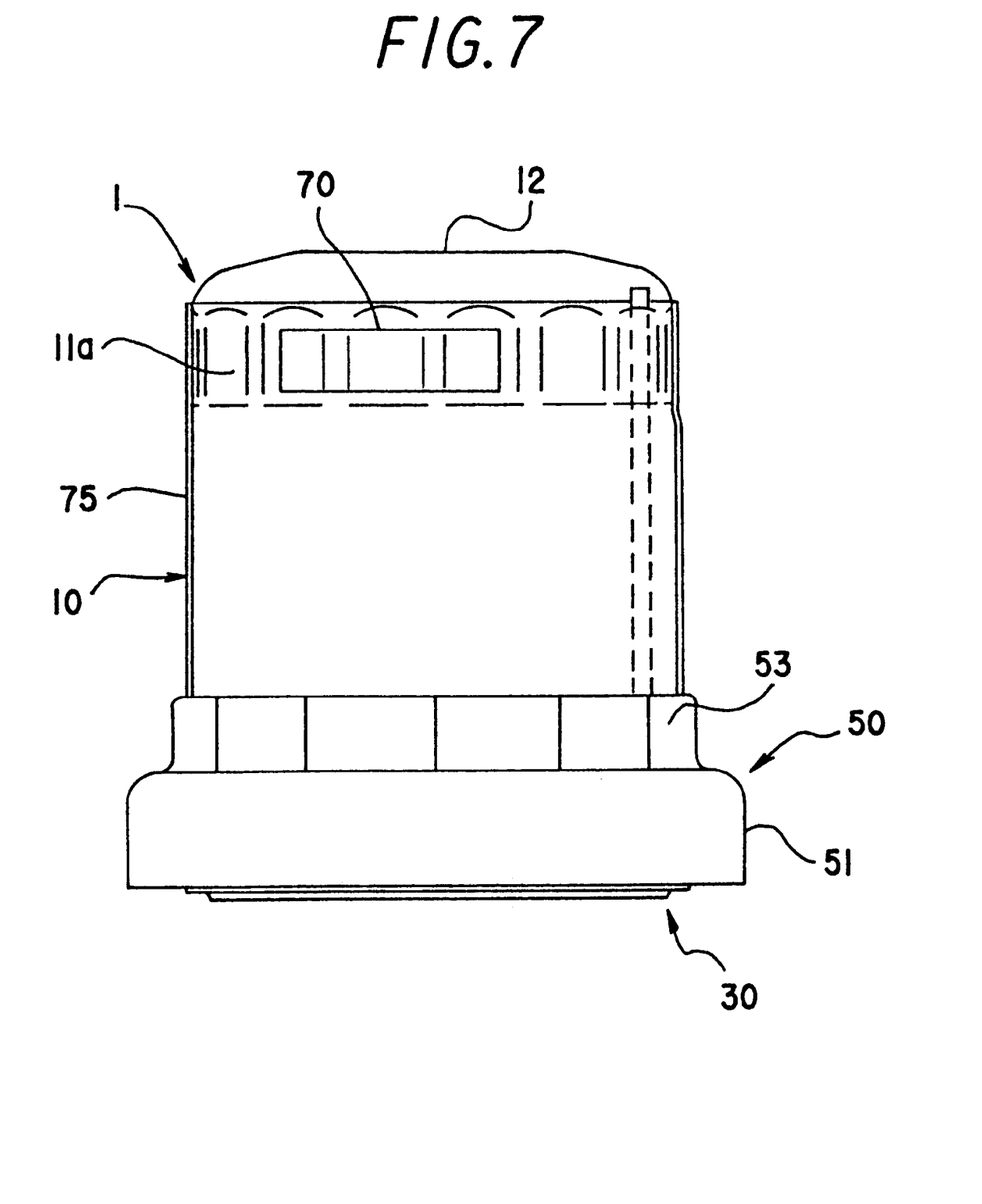
FIG. 7 is a side-elevational view of another embodiment of a filter device of the invention.

In the above embodiment, the caution label 60 is provided on the cylindrical barrel portion 11 of the casing 10, and the heat-shrinkable member 65 is attached only to this cylindrical barrel portion 11. However, as shown in FIG. 7, a caution label 70 may be provided on the polygonal surface 11a of the barrel portion 11, in which case a heat-shrinkable member 75 is extended to cover the polygonal surface 11a.

The caution label 70 is affixed to the polygonal surface lea of the casing 10 in such a manner that this label 70 is bent at the corners of the polygonal surface 11a, and therefore the caution label 70 is positively prevented from being turned relative to the casing in the circumferential direction.

Figure 8:
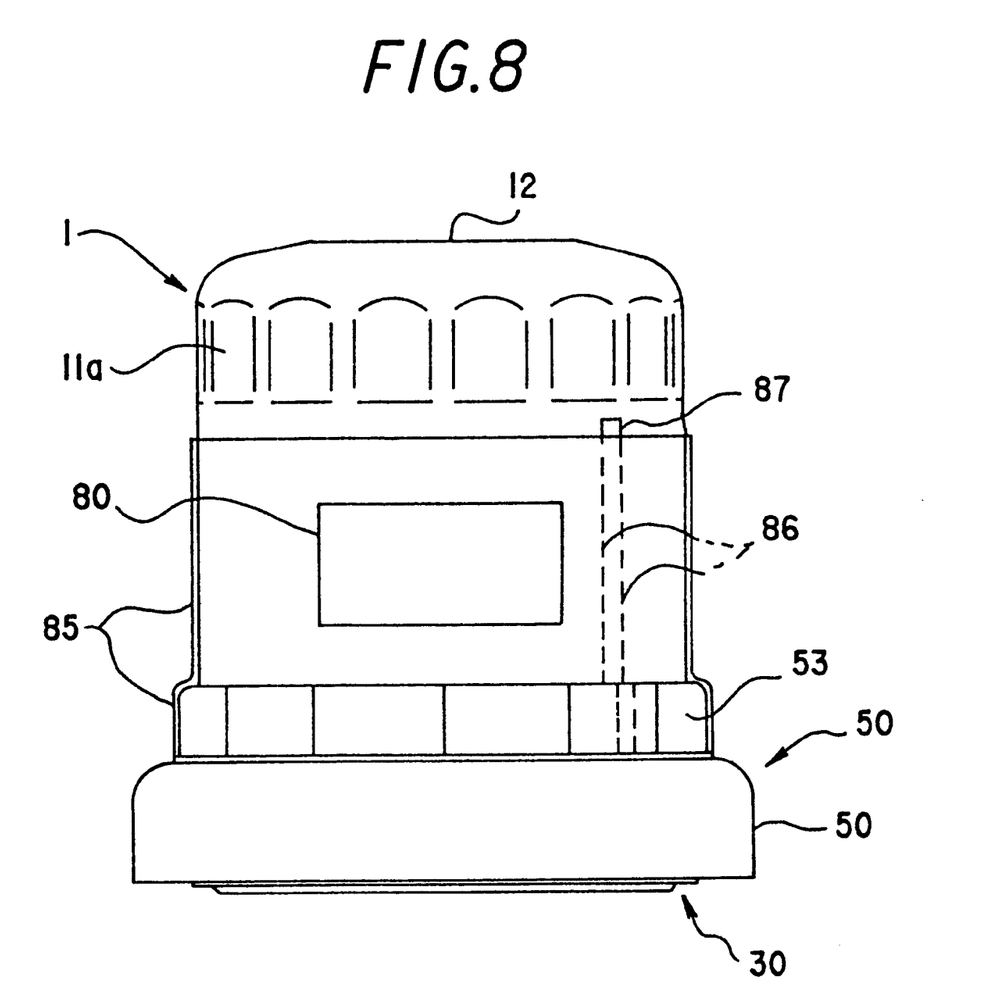
FIG. 8 is a side-elevational view of a further embodiment of a filter device of the invention.
Figure 9:
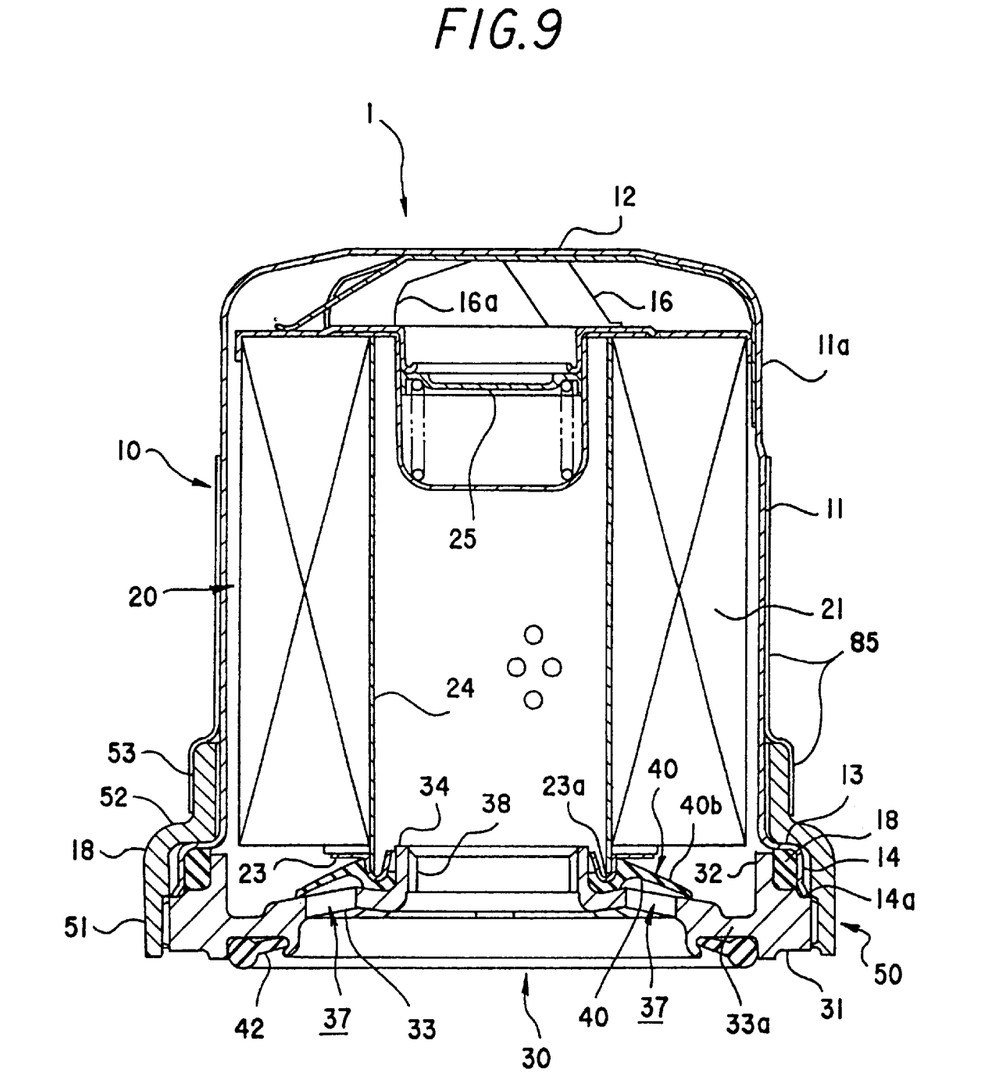
FIG. 9 is a cross-sectional view of this filter device.

Next, another embodiment will be described with reference to FIGS. 8 and 9.

A filter device itself has the same construction as described above for the preceding embodiment, and identical reference numerals denote corresponding members, respectively.

In this embodiment, a caution label 80 is provided on a cylindrical barrel portion 11 of a casing 10, and a heat-shrinkable member 85 is applied to cover the barrel portion 11 and a polygonal tubular portion 53 of a ring nut 50, and therefore the caution label 80 is covered with this heat-shrinkable member 85.

Therefore, after the filter device 1 is assembled, the heat-shrinkable member 85 is attached to the filter device.

Since the heat-shrinkable member 85 covers the outer peripheral surface of the cylindrical barrel portion 11 of the casing 10 and the outer peripheral surface of the polygonal tubular portion 53 of the ring nut 50, this heat-shrinkable member 85 can completely close a gap between the barrel portion 11 of the casing 10 and the polygonal tubular portion 53 of the ring nut 50, thereby positively preventing foreign matter, dust, dirt and water from intruding into the ring nut 50.

Two cut lines 86 and 86 are formed in the heat-shrinkable member 85, and extend axially from its upper edge to its lower edge, and a removal tab 87 extends slightly beyond the upper edge thereof so that the heat-shrinkable member 85 can be easily removed.

In this embodiment, when exchanging a filter element or when effecting the maintenance, the heat-shrinkable member 85 must be removed, and at this time, the heat-shrinkable member 85 can be removed easily and rapidly as described above.

In this embodiment, the heat-shrinkable member 85 may be extended upwardly to cover a polygonal surface 11a, or may be extended downwardly to cover a cylindrical portion 51 of the ring nut 50, and by doing so, the surface area of the filter device 1, protected from damage from the exterior, can be increased.

The heat-shrinkable member itself may have an indication portion, and this indication portion can be provided on the obverse surface or the reverse surface of the heat-shrinkable member 85, or can be provided within the heat-shrinkable member 85. Particularly when the indication portion is provided on the reverse surface or within the heat-shrinkable member 85, the heat-shrinkable member needs to have a light-transmitting property.

When the surface of the heat-shrinkable member is so damaged that the indication portion can not be clearly seen, the heat-shrinkable member is exchanged with a new one having the indication portion, and by doing so, the indication portion can always be clearly seen, and since it is only necessary to exchange the heat-shrinkable member, the operation is more simplified.

While there has been described in connection with the preferred embodiment of the invention, it will be obvious to those skilled in the art that various changes and modifications maybe made therein without departing from the invention, and it is aimed, therefore, to cover in the appended claim all such changes and modifications as fall within the true spirit and scope of the invention.

What is claimed is:

1. A filter device comprising:

a tabular casing with a barrel portion and an open end portion and a closed bottom, a peripheral wall of the open end portion of said casing including a larger-diameter portion larger in diameter than the barrel portion of the casing and a step portion interconnecting the larger-diameter portion and the casing such that the peripheral wall has a crank-shaped cross-section; an open edge of said larger-diameter portion being outwardly bent in a radial direction of said casing;

a filter element received within said casing;

a lid having a diameter smaller than the larger-diameter portion of said casing and which closes the open end portion of said casing and has a communication hole communicating the inside and outside of said casing with each other, said lid having external threads formed on an outer peripheral surface thereof;

a fastening member fastening said casing and said lid together, said fastening member has internal threads formed on an inner peripheral surface thereof for bring in threadedly engagement with said external threads of said lid and also has a smaller-diameter portion smaller in diameter than said larger-diameter portion of said casing;

an annular elastic seal member mounted in a gap which is formed between the step portion of peripheral wall of the open end portion of said casing and a peripheral surface of a portion of said lid opposed to said step portion, and said seal member closes said gap liquid-tight in the radial direction when said filter device is assembled, and a heat shrinkable member having a light-transmitting property for covering an indication portion which is provided on an outer surface of the barrel portion of said casing, wherein said heat-shrinkable member is provided to cover said barrel portion over a circumference thereof in such a manner that said heat-shrinkable member is disposed close to said smaller-diameter portion of said fastening member, threadedly engages with said lid, to close a gap between said barrel portion of said casing and said smaller-diameter portion of said fastening member.

2. The filter device according to claim 1, wherein said heat shrinkable member further having an indication portion for covering said barrel portion of said casing.

3. The filter device according to claim 2, wherein said heat-shrinkable member is provided with a cutting line extending in the axial direction of said heat-shrinkable member.

4. The filter device according to claim 1, wherein said heat shrinkable member covering said indication portion which is provided on an outer surface of said barrel portion of said casing and an outer peripheral surface of said fastening member over a circumference thereof.

5. The filter device according to claim 4, wherein said heat-shrinkable member is provided with a cutting line extending in the axial direction of said heat-shrinkable member.

6. The filter device according to claim 1, wherein said heat-shrinkable member is provided with a cutting line extending in the axial direction of said heat-shrinkable member.

7. A filter device comprising:

a tubular casing with a closed bottom, said casing including a barrel portion and an open distal end portion defining a larger-diameter portion which is different in diameter from said barrel portion and is connected to said barrel portion through a step portion such that the end portion has a crank-shaped cross-section, an open edge of a peripheral wall of the open end portion of said casing being outwardly bent in a radial direction of said casing;

a filter element received within said casing;

a lid closing the open end of said barrel portion and having a communication hole communicating the inside and outside of said casing with each other, wherein said lid includes a peripheral portion opposed to said step portion of said casing in an axial direction, and an opposed peripheral wall opposed to said larger-diameter portion in a radial direction, so that said peripheral portion and said opposed peripheral wall cooperate with said step portion and said larger-diameter portion of said casing to form a gap;

a fastening member fastening said casing and said lid together;

an annular elastic seal member mounted in said gap and held between said step portion of said casing and said peripheral portion of said lid, wherein said elastic seal member is compressed in the axial direction during an assembling operation so that said seal member is expanded and deformed in the radial direction, thereby forming a liquid-tight seal between said larger-diameter portion of said casing and said opposed peripheral wall of said lid.

8. The filter device according to claim 7, further comprising:

a heat-shrinkable member having a light-transmitting property for covering an indication portion which is provided on an outer surface of said casing.

9. The filter device according to claim 8, wherein said heat-shrinkable member is provided with a cutting line extending in the axial direction of said heat-shrinkable member.

10. The filter device according to claim 7, further comprising:
a heat-shrinkable member having an indication portion for covering said casing.

11. The filter device according to claim 10, wherein said heat-shrinkable member is provided with a cutting line extending in the axial direction said heat-shrinkable member.

12. The filter device according to claim 7, wherein said lid has external threads formed on an outer peripheral surface thereof, and said fastening member has internal threads formed on an inner peripheral surface thereof for bring in threadedly engagement with said external threads of said lid and also has a smaller-diameter portion smaller in diameter than said larger-diameter portion of said casing, said filter device further comprising:
a heat shrinkable member having a light-transmitting property for covering an indication portion which is provided on an outer surface of the barrel portion of said casing, wherein said heat-shrinkable member is provided to cover said barrel portion over a circumference thereof in such a manner that said heat-shrinkable member is disposed close to said smaller-diameter portion of said fastening member, threadedly engaged with said lid, to close a gap between said barrel portion of said casing and said smaller-diameter portion of said fastening member.

13. The filter device according to claim 12, wherein said heat-shrinkable member is provided with a cutting line extending in the axial direction of said heat-shrinkable member.

14. The filter device according to claim 7, wherein said lid has external threads formed on an outer peripheral surface thereof, and said fastening member has internal threads formed on an inner peripheral surface thereof for bring in threadedly engagement with said external threads of said lid and also has a smaller-diameter portion smaller in diameter than said larger-diameter portion of said casing, said filter device further comprising:
a heat shrinkable member having a light-transmitting property for covering an indication portion which is provided on an outer surface of the barrel portion of said casing, wherein said heat-shrinkable member is provided to cover said barrel portion of said casing and an outer peripheral surface of said fastening member over a circumference thereof.

15. The filter device according to claim 14, wherein said heat-shrinkable member is provided with a cutting line extending in the axial direction of said heat-shrinkable member.

16. The filter device according to claim 7, wherein said lid is integrally formed with said opposed peripheral wall.

17. The filter device according to claim 7, wherein a radial seal width of said annular elastic seal member is larger than a width of said gap in the radial direction.

18. A filter device comprising:
a tubular casing with an open end portion and a closed bottom, an open edge of a peripheral wall of the open end portion of said casing being outwardly bent in a radial direction of said casing;
a filter element received within said casing;
a lid which closes the open end portion of said casing and has a communication hole communicating the inside and outside of said casing with each other;
a fastening member fastening said casing and said lid together;
an annular elastic seal member mounted in a gap which is formed between the peripheral wall of the open end portion of said casing and a peripheral surface of that portion of a portion of said lid opposed to said peripheral wall, wherein a radial seal width of said annular elastic seal member is larger than a width of said gap in the radial direction, and said seal member closes said gap liquid-tight in the radial direction when said filter device is assembled; and
a heat-shrinkable member covering said casing over a circumference thereof, said heat-shrinkable member being disposed to close a space between said casing and said fastening member.

19. The filter device according to claim 18, wherein said heat-shrinkable member has a light-transmitting property for covering an indication portion which is provided on an outer surface of said casing.

20. The filter device according to claim 18, wherein said heat-shrinkable member has an indication portion for covering said casing.

21. The filter device according to claim 18, wherein said tubular casing includes a barrel portion and an open distal end portion formed into a larger-diameter portion larger in diameter than said barrel portion, said lid closes the open end of said barrel portion and has external threads formed on an outer peripheral surface thereof, said fastening member has internal threads formed on an inner peripheral surface thereof for being in threaded engagement with said external threads of said lid and also has a smaller-diameter portion smaller in diameter than said larger-diameter portion of said casing, and said heat-shrinkable member has a light-transmitting property for covering an indication portion which is provided on an outer surface of the barrel portion of said casing, wherein said heat-shrinkable member covers said barrel portion over a circumference thereof such that said heat-shrinkable member is disposed between said barrel portion of said casing and said smaller-diameter portion of said fastening member threadedly engaged with said lid, so as to close a space between said barrel portion of said casing and said smaller-diameter portion of said fastening member.

22. The filter device according to claim 18, wherein said tubular casing includes a barrel portion and an open distal end portion formed into a larger-diameter portion larger in diameter than said barrel portion, said lid closes the open end of said barrel portion and has external threads formed on an outer peripheral surface thereof, said fastening member has internal threads formed on an inner peripheral surface thereof for being in threaded engagement with said external threads of said lid and also has a smaller-diameter portion smaller in diameter than said larger-diameter portion of said casing, and said heat-shrinkable member has a light-transmitting property for covering an indication portion which is provided on an outer surface of the barrel portion of said casing, wherein said heat-shrinkable member covers said barrel portion of said casing and an outer peripheral surface of said fastening member over a circumference thereof, to close a space between said barrel portion of said casing and said smaller-diameter portion of said fastening member.

23. The filter device according to claim 18, wherein said heat-shrinkable member has two cutting lines extending in the axial direction of said heat-shrinkable member, and has a removal tab extending slightly beyond an upper edge of said heat-shrinkable member between the two cutting lines.

24. A filter device comprising:

a tubular casing with a closed bottom, said casing including a barrel portion and an open distal end portion defining a different-diameter portion which is different in diameter from said barrel portion and is connected to said barrel portion through a step portion, an open edge of a peripheral wall of the open end portion of said casing being outwardly bent in a radial direction of said casing;

a filter clement received within said casing;

a lid closing an open end of said casing and having a communication hole communicating the inside and outside of said casing with each other, wherein said lid includes a peripheral portion opposed to said step portion of said casing in an axial direction, and an opposed peripheral wall opposed to said different-diameter portion in a radial direction, so that said peripheral portion and said opposed peripheral wall cooperate with said step portion and said different-diameter portion of said casing to form a gap;

a fastening member fastening said casing and said lid together;

an annular elastic seal member mounted in said gap and held between said step portion of said casing and said peripheral portion of said lid, wherein said elastic seal member is compressed in the axial direction during an assembling operation so that said seal member is expanded and deformed in the radial direction, thereby forming a liquid-tight seal between said different-diameter portion of said casing and said opposed peripheral wall of said lid; and a heat-shrinkable member covering said casing over a circumference thereof, said heat-shrinkable member being disposed to close a space between said casing and said fastening member.

25. The filter device according to claim 24, wherein said heat-shrinkable member has a light-transmitting property covering an indication portion provided on an outer surface of said casing.

26. The filter device according to claim 24, wherein said heat-shrinkable member has an indication portion covering said casing.

27. The filter device according to claim 24, wherein said open distal end portion is formed onto a larger-diameter portion larger in diameter than said barrel portion, said lid closes the open end of said barrel portion and has external threads formed on an outer peripheral surface thereof, said fastening member has internal threads formed on an inner peripheral surface thereof for threaded engagement with said external threads of said lid and also has a smaller-diameter portion smaller in diameter than said larger-diameter portion of said casing, and said heat-shrinkable member has light-transmitting property covering an indication portion provided on an outer surface of the barrel portion of said casing, wherein said heat-shrinkable member covers said barrel portion over a circumference thereof in such a manner that said heat-shrinkable member is disposed between said barrel portion of said casing and said smaller-diameter portion of said fastening member threadedly engaged with said lid, so as to close a space between said barrel portion of said casing and said smaller-diameter portion of said fastening member.

28. The filter device according to claim 24, wherein said open distal end portion is formed into a larger-diameter portion larger in diameter than said barrel portion, said lid closes the open end of said barrel portion and has external threads formed on an outer peripheral surface thereof, said fastening member has internal threads formed on an inner peripheral surface thereof for threaded engagement with said external threads of said lid and also has smaller-diameter portion smaller in diameter than said larger-diameter portion of said casing, and said heat-shrinkable member has a light-transmitting property covering an indication portion provided on an outer surface of the barrel portion of said casing, wherein said heat-shrinkable member covers said barrel portion of said casing and an outer peripheral surface of said fastening member over a circumference thereof, to close a space between said barrel portion of said casing and said smaller-diameter portion of said fastening member.

29. The filter device according to claim 24, wherein said heat-shrinkable member has two cutting lines extending in the axial direction of said heat-shrinkable member, and has a removal tab extending slightly beyond an upper edge of said heat-shrinkable member between the two cutting lines.

* * * * *